United States Patent
Lee

(10) Patent No.: US 11,093,823 B2
(45) Date of Patent: Aug. 17, 2021

(54) NEUROMORPHIC DEVICE INCLUDING A SYNAPSE ARRAY WITH INVERTING CIRCUITS

(71) Applicant: SK hynix Inc., Icheon (KR)

(72) Inventor: Hyung-Dong Lee, Hwaseong (KR)

(73) Assignee: SK hynix Inc., Icheon (KR)

( * ) Notice: Subject to any disclaimer, the term of this patent is extended or adjusted under 35 U.S.C. 154(b) by 1120 days.

(21) Appl. No.: 15/595,832

(22) Filed: May 15, 2017

(65) Prior Publication Data

US 2018/0181856 A1 Jun. 28, 2018

(30) Foreign Application Priority Data

Dec. 22, 2016 (KR) .......................... 10-2016-0176506

(51) Int. Cl.
*G06N 3/063* (2006.01)

(52) U.S. Cl.
CPC .................... *G06N 3/063* (2013.01)

(58) Field of Classification Search
CPC ....................................... G06N 3/063
USPC .......................................... 706/33
See application file for complete search history.

(56) References Cited

U.S. PATENT DOCUMENTS 7,359,888 B2   4/2008   Snider
2006/0057998 A1   3/2006   Perumana et al.

FOREIGN PATENT DOCUMENTS

KR   1020180120511 A   11/2018

OTHER PUBLICATIONS

Starzyk et al ("Memristor Crossbar Architecture for Synchronous Neural Networks" 2014) i (Year: 2014).*
Park et al ("Neuromorphic System Based on CMOS Inverters and Si-Based Synaptic Device" May 2016), (Year: 2016).*
Afifi et al ("CMOL implementation of spiking neurons and spike-timing dependent plasticity" 2010) (Year: 2010).*
Payvand et al ("A CMOS-Memristive Self-Learning Neural Network for Pattern Classification Applications" 2014) (Year: 2014).*

* cited by examiner

*Primary Examiner* — Lut Wong

(57) ABSTRACT

A neuromorphic device may include: a pre-synaptic neuron; a synapse electrically connected with the pre-synaptic neuron through a row line; and a post-synaptic neuron electrically connected with the synapse through a column line. The post-synaptic neuron may include a first inverter, the first inverter comprising a first pull-up transistor and a first pull-down transistor, a body of the first pull-up transistor and a body of the first pull-down transistor being electrically connected with a first output node of the first inverter.

20 Claims, 10 Drawing Sheets

NEUROMORPHIC DEVICE INCLUDING A SYNAPSE ARRAY WITH INVERTING CIRCUITS

CROSS-REFERENCE TO RELATED APPLICATIONS

The present application claims priority to Korean Patent Application No. 10-2016-0176506, filed on Dec. 22, 2016, which is incorporated herein by reference in its entirety.

BACKGROUND

1. Field

Embodiments of the present disclosure relate to neuromorphic devices, and more particularly, to neuromorphic devices including pre-synaptic neurons with inverting circuits, post-synaptic neurons with inverting circuits, and synapse arrays with inverting circuits.

2. Description of the Related Art

Recently, much attention has been paid to devices in the field of neuromorphic technology, which use chips that mimic the human brain. A neuromorphic device based on the neuromorphic technology includes a plurality of pre-synaptic neurons, a plurality of post-synaptic neurons, and a plurality of synapses. The neuromorphic device outputs pulses or spikes having various levels, amplitude, and/or times, according to a learning state of the neuromorphic device.

SUMMARY

Various embodiments are directed to a neuromorphic device having a synapse array which has a smooth output. For example, the smooth output may be similar to a sigmoid function.

Also, various embodiments are directed to pre-synaptic neurons with inverting circuits, post-synaptic neurons with inverting circuits, and an inter-synapse circuit.

Also, various embodiments are directed to inverting circuits having various circuit configurations.

In an embodiment, a neuromorphic device may include: a pre-synaptic neuron; a synapse electrically connected with the pre-synaptic neuron through a row line; and a post-synaptic neuron electrically connected with the synapse through a column line. The post-synaptic neuron may include a first inverter, the first inverter comprising a first pull-up transistor and a first pull-down transistor, a body of the first pull-up transistor and a body of the first pull-down transistor being electrically connected with a first output node of the first inverter.

The first pull-up transistor may include: a source electrode electrically connected with a supply voltage node; a drain electrode electrically connected with the output node; and a gate electrode electrically connected with the column line.

The first pull-down transistor may include: a source electrode electrically connected with a ground voltage node; a drain electrode electrically connected with the output node; and a gate electrode electrically connected with the column line.

The post-synaptic neuron may further include a second inverter. The second inverter may include a second pull-up transistor and a second pull-down transistor. A gate electrode of the second pull-up transistor and a gate electrode of the second pull-down may be electrically connected with the first output node.

The second pull-up transistor may include: a source electrode electrically connected with the supply voltage node; and a drain electrode electrically connected with an output terminal.

The second pull-down transistor may include: a source electrode electrically connected with the ground voltage node; and a drain electrode electrically connected with an output terminal.

The first pull-up transistor may include a plurality of PMOS transistors connected in series.

The first pull-down transistor may include a plurality of NMOS transistors connected in series.

The post-synaptic neuron may further include an integrator having an input terminal and an output terminal, the input terminal being electrically connected with the column line, the output terminal being electrically connected with an input node of the first inverter.

The post-synaptic neuron may further include a comparator disposed between the integrator and the first inverter. An input terminal of the comparator may be electrically connected with the output terminal of the integrator. An output terminal of the comparator may be electrically connected with the input node of the first inverter.

In an embodiment, a neuromorphic device may include: a pre-synaptic neuron; a synapse electrically connected with the pre-synaptic neuron through a row line; and a post-synaptic neuron electrically connected with the synapse through a column line. The post-synaptic neuron may include a first inverter. The post-synaptic neuron may include a first output node, a first PMOS transistor, and a first NMOS transistor. The first PMOS transistor may have a source electrode, a drain electrode, and a body. The source electrode of the PMOS transistor may be electrically connected with a supply voltage node. The drain electrode and body of the first PMOS transistor may be electrically connected with the first output node. The first NMOS transistor may have a source electrode, a drain electrode, and a body. The source electrode of the first NMOS transistor may be electrically connected with a ground voltage node. The drain electrode and body of the first NMOS transistor may be electrically connected with the first output node.

The post-synaptic neuron may further include a second inverter. The second inverter may include a second output node, a second PMOS transistor, and a second NMOS transistor. The second PMOS transistor may include a source electrode, a drain electrode, and a body. The source electrode of the second PMOS transistor may be electrically connected with the supply voltage node. The drain electrode and body of the second PMOS transistor may be electrically connected with the output node. The second NMOS transistor may have a source electrode, a drain electrode, and a body. The source electrode of the second NMOS transistor may be electrically connected with the ground voltage node. The drain electrode and body of the second NMOS transistor may be electrically connected with the second output node.

The output node of the first inverter may be electrically connected with a gate electrode of the second PMOS transistor and a gate electrode of the second NMOS transistor.

The second PMOS transistor may include a plurality of PMOS transistors connected in series, and the body of each of the plurality of PMOS transistors may be electrically connected with the output node terminal.

The first inverter may include a plurality of NMOS transistors connected in series. The first NMOS transistor may be one of the plurality of NMOS transistors. a body of each of the plurality of NMOS transistors may be electrically connected with the first output node.

The post-synaptic neuron may further include an integrator having an input terminal and an output terminal. The input terminal may be electrically connected with the column line. The output terminal may be electrically connected with an input node of the first inverter.

The post-synaptic neuron may further include a comparator disposed between the integrator and the first inverter. An input terminal of the comparator may be electrically connected with the output terminal of the integrator. An output terminal of the comparator may be electrically connected with the input node of the first inverter.

In an embodiment, a neuromorphic device may include: an input device and an output device; a plurality of synapse arrays between the input device and the output device, each of the plurality of synapse arrays including a plurality of synapses, each of the plurality of synapses being electrically connected with a pre-synaptic neuron through a row line; and an inter-synapse circuit between the plurality of synapse arrays, the inter-synapse circuit including a post-synaptic neuron electrically connected with one of the plurality of synapses through a column line. The post-synaptic neuron of the inter-synapse circuit may include a first inverter.

The first inverter may include a first pull-up transistor and a first pull-down transistor. The first pull-up transistor may include one or more first PMOS transistors. A body of each of the one or more first PMOS transistors may be electrically connected with an output node of the first inverter. The first pull-down transistor may include one or more first NMOS transistors. A body of each of the one or more first NMOS transistors may be electrically connected with the output node of the first inverter.

The inter-synapse circuit may further include a second inverter connected in series to the first inverter. The second inverter may include a second pull-up transistor and a second pull-down transistor. The second pull-up transistor may include one or more second PMOS transistors. A body of each of the one or more second PMOS transistors may be electrically connected with an output node of the second inverter. The second pull-down transistor may include one or more second NMOS transistors. A body of each of the one or more second PMOS transistors may be electrically connected with the output node of the second inverter.

DETAILED DESCRIPTION

Figure 1:
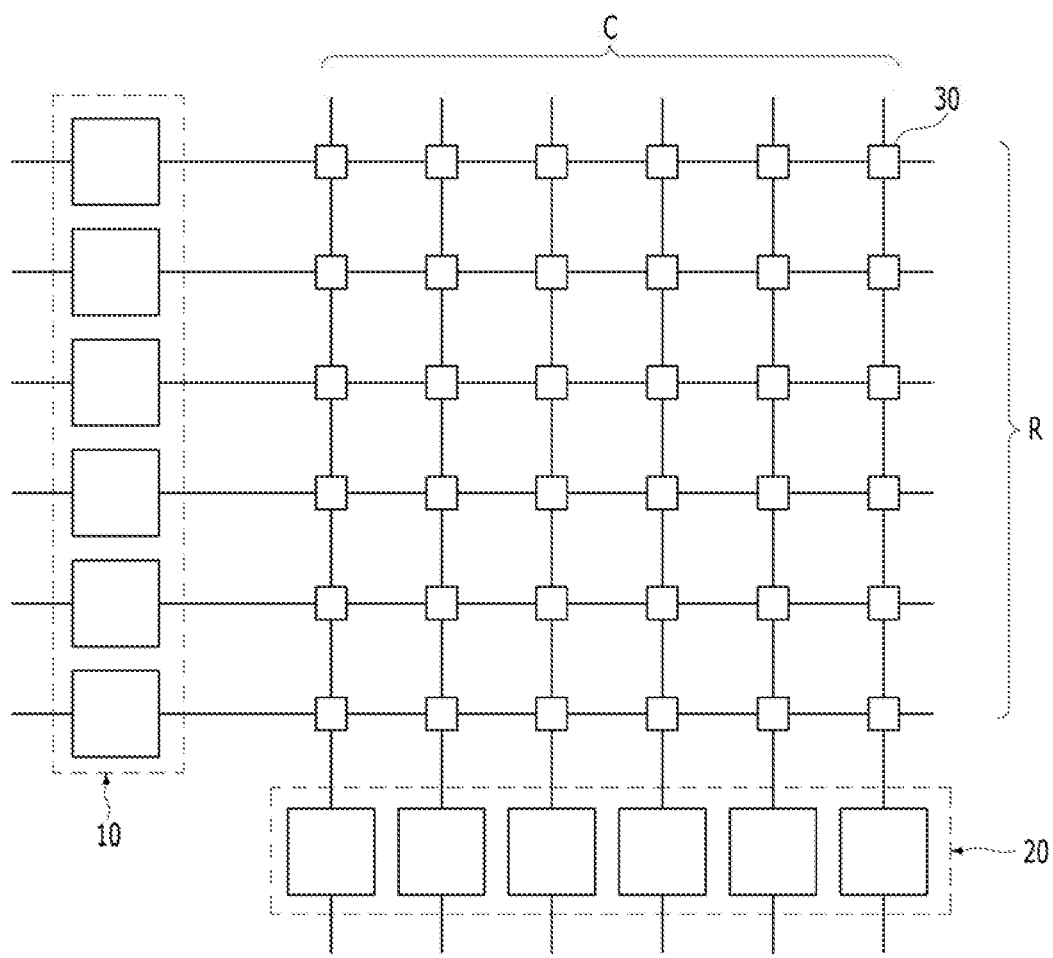
FIG. 1 is a block diagram conceptually illustrating a synapse array of a neuromorphic device in accordance with an embodiment.

Various embodiments will be described below in more detail with reference to the accompanying drawings. Embodiments of the present disclosure may, however, have different forms and should not be construed as limited to the embodiments set forth herein. Rather, these embodiments are provided so that this disclosure will be thorough and complete, and will fully convey the scope of the claims to those skilled in the art.

Terms used in this specification are used to describe exemplary embodiments without limiting the present disclosure. The terms of a singular form may include plural forms unless referred to the contrary. The meaning of 'comprise' or 'comprising' used in the specification specifies a component, step, operation, and/or element, but does not exclude other components, steps, operations, and/or elements.

When one element is referred to as being 'connected with' or 'coupled with' another element, the former element may be directly connected or coupled with the latter element, or another element may be interposed therebetween. On the other hand, when one element is referred to as being 'directly connected with' or 'directly coupled with' another element, it may indicate that no element is interposed therebetween. In the present disclosure, 'and/or' may include each described item, or one or more combinations of the described items.

The terms such as 'below,' 'beneath,' 'lower,' 'above,' and 'upper,' which are spatially relative terms, may be used to simply describe the correlation between one element or components and another element or other components illustrated in the drawings. The spatially relative terms should be understood as terms indicating different directions of elements during use or operation, in addition to the directions illustrated in the drawings. For example, when an element illustrated in the drawings is turned over, an element referred to as being 'below' or 'beneath' another element may be placed above another element.

Throughout the specification, like reference numerals refer to the same elements. Therefore, although the same or similar reference numerals are not mentioned or described in the corresponding drawing, the reference numerals may be described with reference to other drawings. Furthermore, although elements are not represented by reference numerals, the elements may be described with reference to other drawings.

In this specification, 'potentiating,' 'setting,' 'learning,' and 'training' may be used as the same or similar terms, and 'depressing,' 'resetting,' and 'initiating' may be used as the same or similar terms. For example, an operation of lowering the resistances of synapses may be exemplified as potentiating, setting, learning, or training, and an operation of raising the resistances of synapses may be exemplified as depressing, resetting, or initiating. Furthermore, when synapses are potentiated, set, or trained, a gradually increasing voltage/current may be outputted because the conductivities of the synapses are increased. On the other hand, when synapses are depressed, reset, or initiated, a gradually decreasing voltage/current may be outputted because the conductivities of the synapses are decreased. For convenience of description, the terms 'data pattern,' 'electrical signal,' 'pulse,' 'spike,' and 'fire' may have the same, a similar, or a compatible meaning. Furthermore, the terms 'voltage' and 'current' may also be interpreted as having the same or a compatible meaning.

FIG. 1 is a block diagram conceptually illustrating a synapse array of a neuromorphic device in accordance with an embodiment. Referring to FIG. 1, the synapse array of the neuromorphic device in accordance with the present embodiment may include a plurality of pre-synaptic neurons 10, a plurality of post-synaptic neurons 20, and a plurality of synapses 30. The synapses 30 may be arranged at the respective intersections between row lines R, which extend in a row direction from the pre-synaptic neurons 10, and column lines C, which extend in a column direction from the post-synaptic neurons 20. The row direction may cross the column direction.

The pre-synaptic neurons 10 may transmit electric pulses to the synapses 30 through the row lines R in a learning mode, reset mode, or read mode.

The post-synaptic neurons 20 may transmit electrical pulses to the synapses 30 through the column lines C in the learning mode or reset mode, and may receive electrical pulses from the synapses 30 through the column lines C in the read mode.

Each of the synapses 30 may include a variable resistor. For example, the variable resistor may cause the resistance of each of the synapses 30 to gradually decrease when the synapse 30 receives set pulses, and to gradually increase when the synapse 30 receives reset pulses.

Figure 2A:
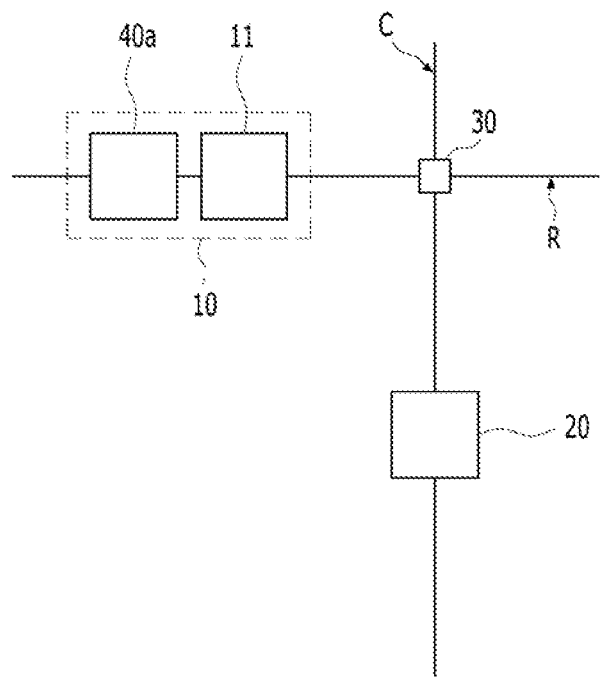
FIGS. 2A to 2C are block diagrams conceptually illustrating parts of synapse arrays in neuromorphic devices, in accordance with various embodiments.
Figure 2B:
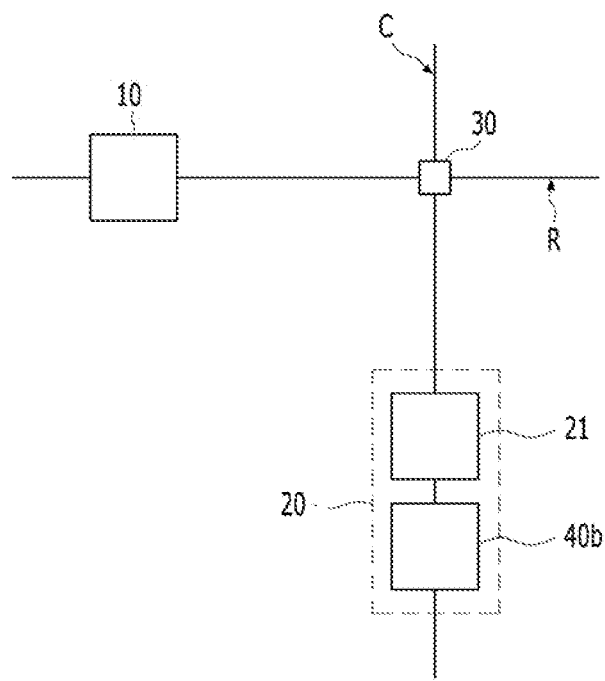
Figure 2C:
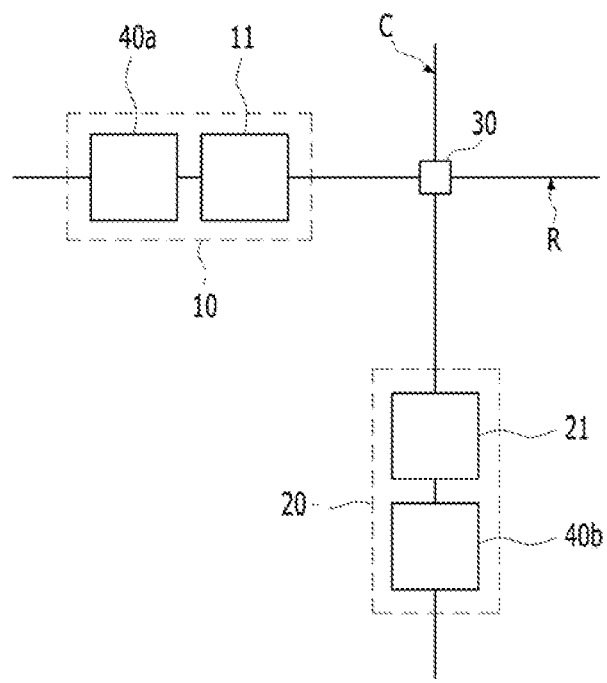

FIGS. 2A to 2C are block diagrams conceptually illustrating parts of synapse arrays in neuromorphic devices, in accordance with various embodiments. Referring to FIGS. 2A to 2C, each of the synapse arrays may include a pre-synaptic neuron 10, a synapse 30 electrically connected with the pre-synaptic neuron 10 through a row line R, and a post-synaptic neuron 20 electrically connected with the synapse 30 through a column line C.

Referring to FIG. 2A, the pre-synaptic neuron 10 of the synapse array may include a pre-synaptic neuron inverting circuit 40a and a pre-synaptic neuron circuit 11, which are electrically connected to each other in series. The pre-synaptic neuron inverting circuit 40a may smooth a pulse-shaped input signal. For example, a voltage (or current) of the smoothed input signal may be like a sigmoid function. That is, the smoothed input signal may have a sigmoidal shape when graphed with respect to time. The pre-synaptic neuron inverting circuit 40a may input the smoothed input signal to the pre-synaptic neuron circuit 11.

Referring to FIG. 2B, the post-synaptic neuron 20 of the synapse array may include a post-synaptic neuron circuit 21 and a post-synaptic neuron inverting circuit 40b, which are electrically connected to each other in series. The post-synaptic neuron inverting circuit 40b may smooth a pulse-shaped output signal of the post-synaptic neuron circuit 21. For example, the relationship between a voltage (or current) and time of the smoothed output signal may be like a sigmoid function.

Referring to FIG. 2C, the pre-synaptic neuron 10 of the synapse array may include a pre-synaptic neuron inverting circuit 40a and a pre-synaptic neuron circuit 11, which are electrically connected to each other in series. The post-synaptic neuron 20 may include a post-synaptic neuron circuit 21 and a post-synaptic neuron inverting circuit 40b, which are electrically connected to each other in series.

Figure 3A:
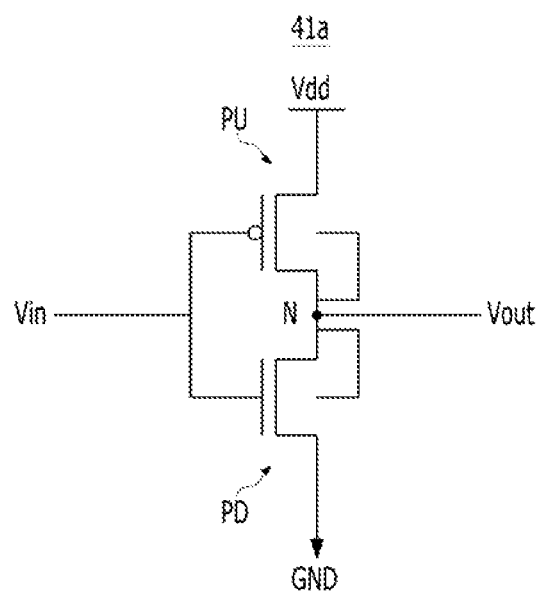
FIGS. 3A to 3C are block diagrams conceptually illustrating inverting circuits of synapse arrays in neuromorphic devices, in accordance with various embodiments.
Figure 3B:
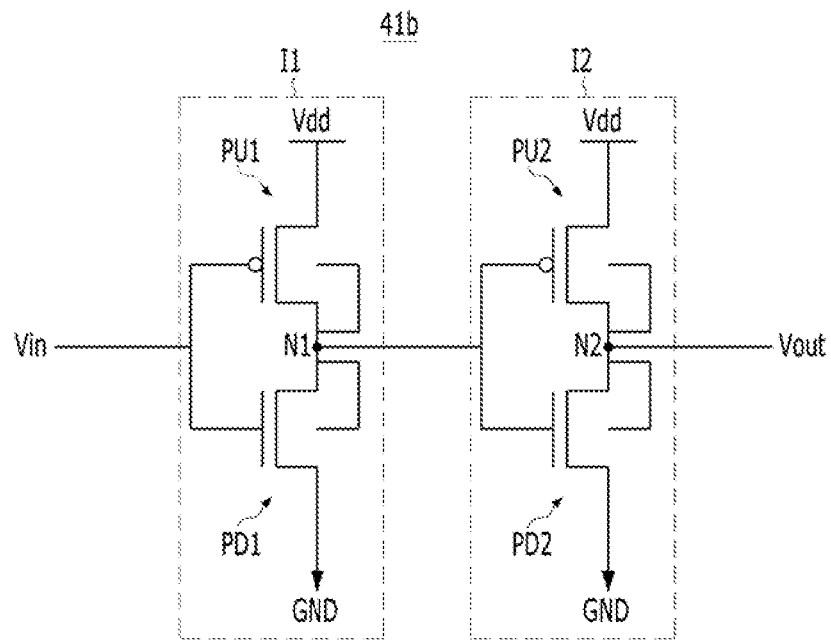
Figure 3C:
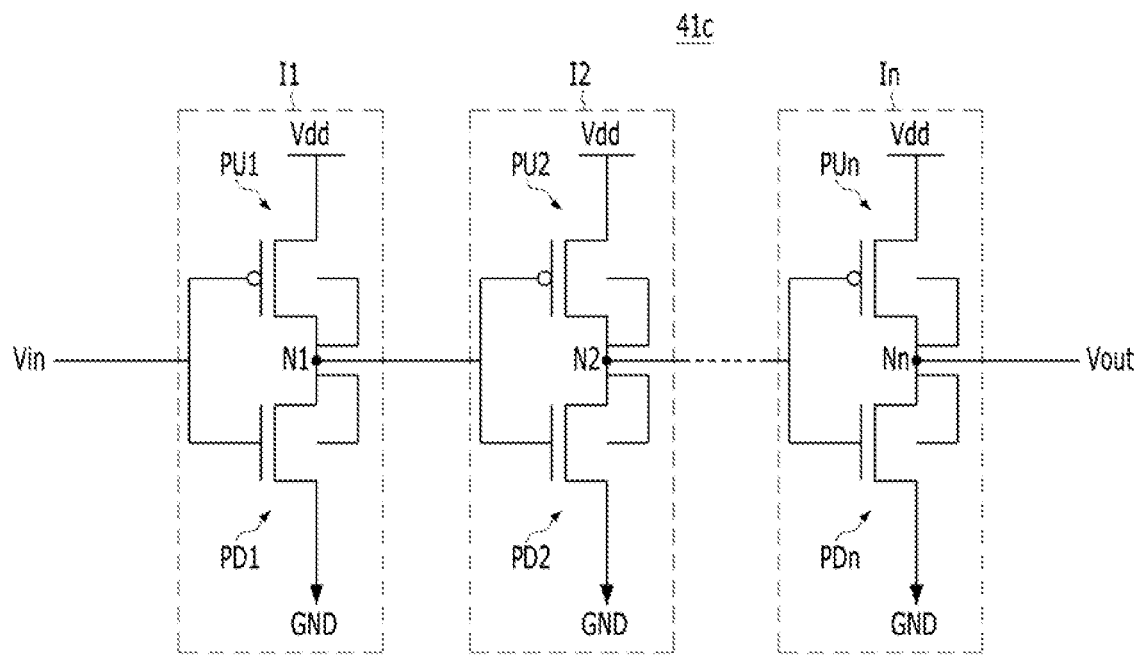

FIGS. 3A to 3C are block diagrams conceptually illustrating inverting circuits 41a to 41c of synapse arrays in neuromorphic devices, in accordance with various embodiments. The inverting circuits 41a to 41c may be included in the pre-synaptic neuron inverting circuit 40a and/or the post-synaptic neuron inverting circuit 40b, which are illustrated in FIGS. 2A to 2C.

Referring to FIG. 3A, the inverting circuit 41a of the synapse array may include a pull-up transistor PU and a pull-down transistor PD, which are connected to each other in series. Gate electrodes of the pull-up transistor PU and the pull-down transistor PD may be electrically connected with an input terminal Vin. A source electrode of the pull-up transistor PU may be electrically connected with a supply voltage node Vdd, and a source electrode of the pull-down transistor PD may be electrically connected with a ground voltage node GND. Drain electrodes of the pull-up transistor PU and the pull-down transistor PD may be electrically connected with each other. Furthermore, each of the drain electrode and a body of each of the pull-up transistor PU and the pull-down transistor PD may be electrically connected with an output node N. That is, the body and the drain electrode of each of the pull-up transistor PU and the pull-down transistor PD may be electrically connected with each other at the output node N. The output node N may be electrically connected with an output terminal Vout. The pull-up transistor PU may include a P-channel Metal-Oxide Semiconductor (PMOS) transistor, and the pull-down transistor PD may include an N-channel Metal-Oxide Semiconductor (NMOS) transistor.

Referring to FIG. 3B, the inverting circuit 41b of the synapse array may include two inverters I1 and I2 connected to each other in series. Each of the inverters I1 and I2 may include features of the inverting circuit 41a of FIG. 3A. For example, each body of a first pull-up transistor PU1 and a first pull-down transistor PD1 in the first inverter I1 may be electrically connected with a first output node N1, and each body of a second pull-up transistor PU2 and a second pull-down transistor PD2 in the second inverter I2 may be electrically connected with a second output node N2. That is, the body and drain electrode of each of the first pull-up transistor PU1 and the first pull-down transistor PD1 may be electrically connected with each other at the first output node N1, and the body and drain electrode of each of the second pull-up transistor PU2 and the second pull-down transistor PD2 may be electrically connected with each other at the second output node N2. The first output node N1 of the first inverter I1 may be electrically connected with a gate electrode of the second pull-up transistor PU2 and a gate electrode of the second pull-down transistor PD2 of the second inverter I2. The second output node N2 of the second inverter I2 may be electrically connected with an output terminal Vout.

Referring to FIG. 3C, the inverting circuit 41c of the synapse array may include a plurality of inverters I1, I2, . . . , In connected with each other in series. Each of the inverters I1, I2, . . . , In may include features of the inverting circuit 41a of FIG. 3A. For example, the inverters I1, I2, . . . , In, respectively, include pull-up transistors PU1, PU2, . . . , PUn, and pull-down transistors PD1, PD2, . . . , PDn. The body and drain electrode of each of the pull-up transistors PU1, PU2 , . . . , PUn may be electrically connected to each other and to a corresponding one of the output nodes N1, N2 , . . . , Nn. The body and drain electrode of each of the pull-down transistors PD1, PD2 , . . . , PDn may be electrically connected to each other and to a corresponding one of the output nodes N1, N2, ..., Nn.

Figure 4A:
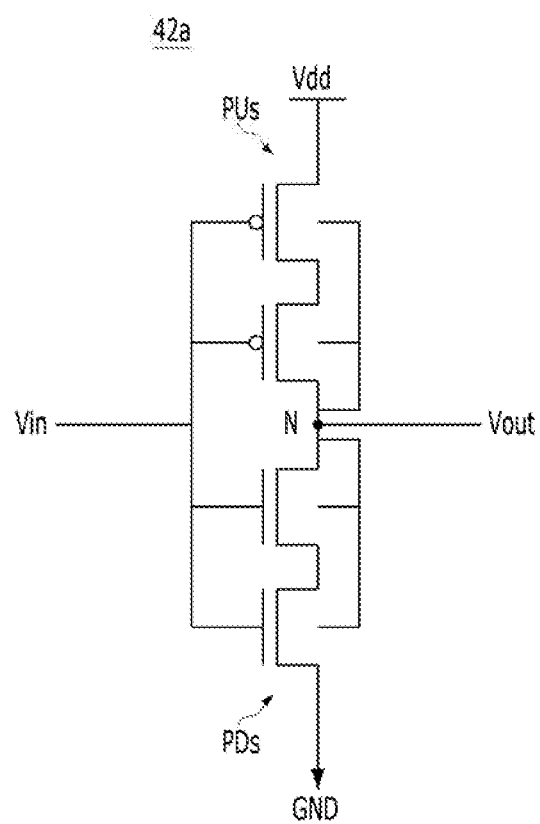
FIGS. 4A to 4C are block diagrams conceptually illustrating inverting circuits of synapse arrays in neuromorphic devices, in accordance with various embodiments.
Figure 4B:
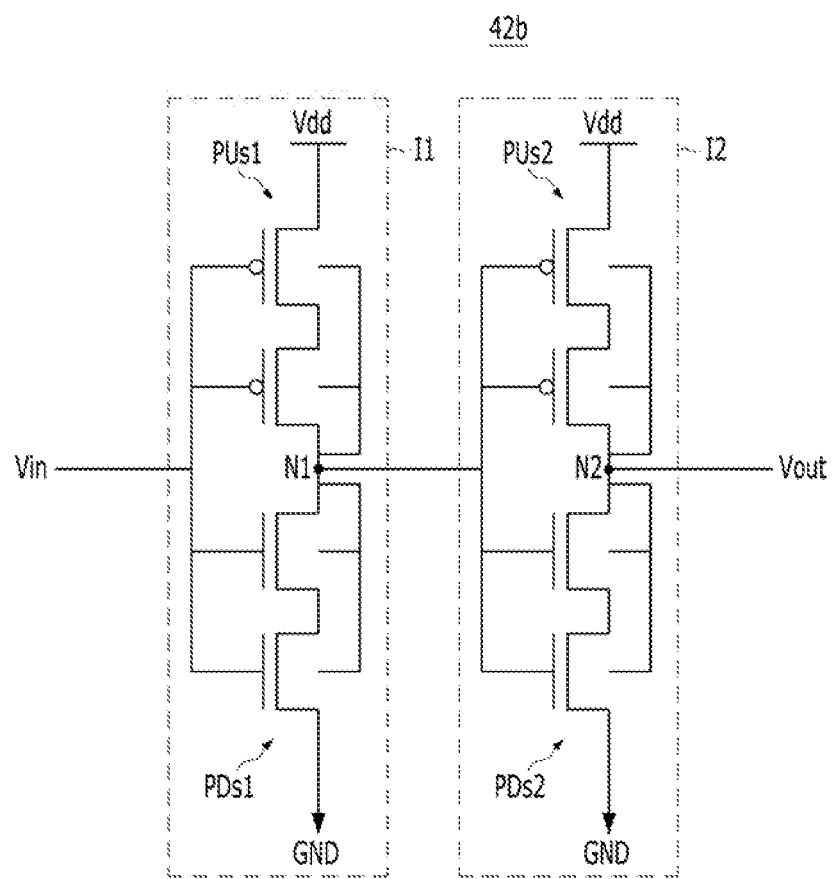
Figure 4C:
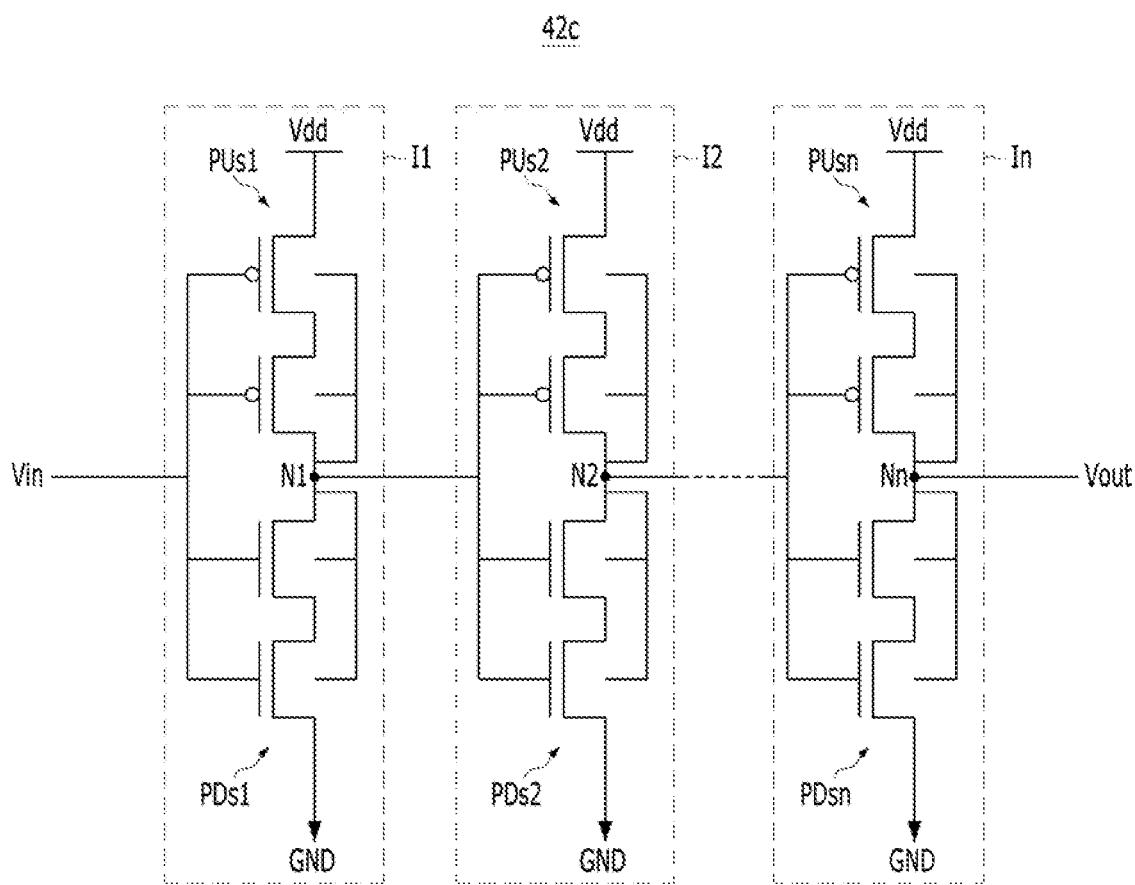

FIGS. 4A to 4C are block diagrams conceptually illustrating inverting circuits 42a to 42c of synapse arrays in neuromorphic devices, in accordance with various embodiments.

Referring to FIG. 4A, the inverting circuit 42a of the synapse array may include a plurality of pull-up transistors PUs connected to each other in series and a plurality of pull-down transistors PDs connected to each other in series. Bodies of the pull-up transistors PUs and the pull-down transistors PDs may be electrically connected with an output node N.

Referring to FIG. 4B, the inverting circuit 42b of the synapse array may include first and second inverters I1 and I2 connected with each other in series. The first inverter I1 may include a first plurality of pull-up transistors PUs1 connected to each other in series and a first plurality of pull-down transistors PDs1 connected to each other in series. The second inverter I2 may include a second plurality of pull-up transistors PUs2 connected to each other in series and a second plurality of pull-down transistors PDs2 connected to each other in series.

Each of the inverters I1 and I2 may include features of the inverting circuit 42a of FIG. 4A. For example, bodies of the first plurality of pull-up transistors PUs1 and the first plurality of pull-down transistors PDs1 in the first inverter I1 may be electrically connected with a first output node N1, and bodies of the second plurality of pull-up transistors PUs2 and the second plurality of pull-down transistors PDs2 in the second inverter I2 may be electrically connected with a second output node N2.

Referring to FIG. 4C, the inverting circuit 42c of the synapse array may include a plurality of inverters I1, I2, ..., In connected with each other in series. Each of the inverters I1, I2, ..., In may include features of the inverting circuit 42a of FIG. 4A. That is, the inverter I1 may include a plurality of pull-up transistors PUs1 connected in series and a plurality of pull-down transistors PDs1 connected in series, the inverter I2 may include a plurality of pull-up transistors PUs2 connected in series and a plurality of pull-down transistors PDs2 connected in series, and the inverter In may include a plurality of pull-up transistors PUsn connected in series and a plurality of pull-down transistors PDsn connected in series. The bodies of the pull-up transistors PUs1, PUs2, ..., PUsn and the bodies of the pull-down transistors PDs1, PDs2, ..., PDsn may be electrically connected with output nodes N1, N2, ..., Nn, respectively.

Figure 5:
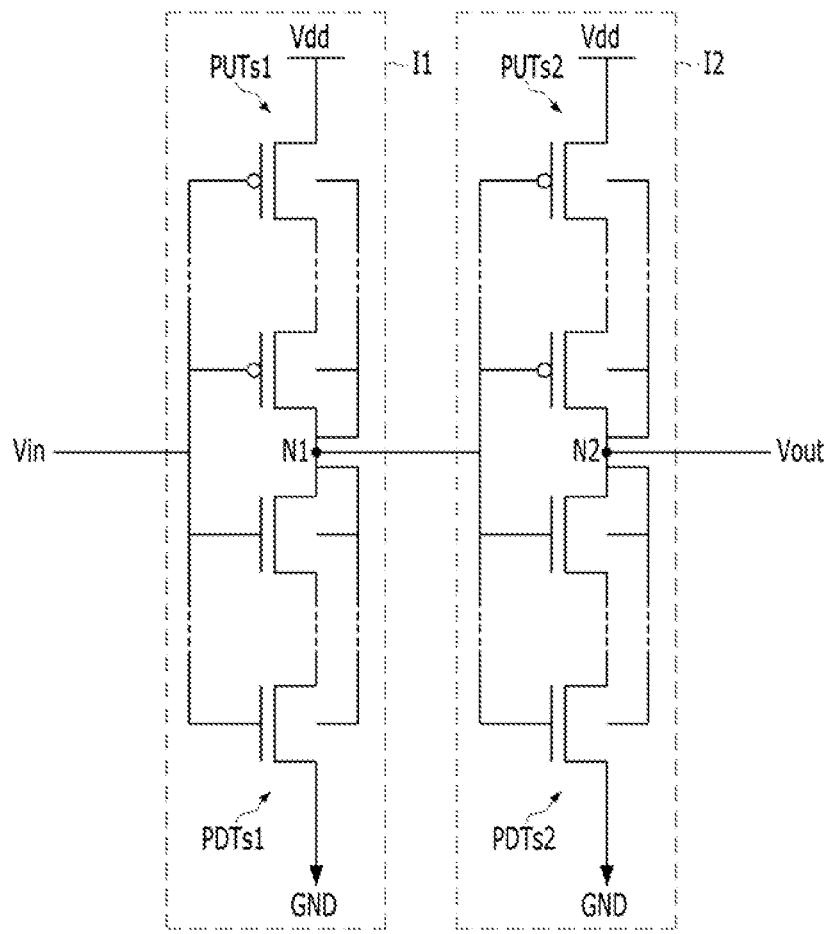
FIG. 5 is a block diagram conceptually illustrating an inverting circuit of a synapse array in a neuromorphic device in accordance with an embodiment.

FIG. 5 is a block diagram conceptually illustrating an inverting circuit 43 of a synapse array in a neuromorphic device, in accordance with an embodiment. Referring to FIG. 5, the inverting circuit 43 of the synapse array may include two inverters I1 and I2 connected in series. The inverters I1 and I2 may include pull-up transistor strings PUTs1 and PUTs2 and pull-down transistor strings PDTs1 and PDTs2, respectively. Each of the pull-up transistor strings PUTs1 and PUTs2 may include a plurality of PMOS transistors connected in series. Each of the pull-down transistor strings PDTs1 and PDTs2 may include a plurality of NMOS transistors connected in series. Bodies of the transistors of the pull-up transistor strings PUTs1 and the pull-down transistor strings PDTs1 may be electrically connected with a first output node N1, and bodies of the transistors of the pull-up transistor strings PUTs2 and the pull-down transistor strings PDTs2 may be electrically connected with a second output node N2.

An input terminal Vin may be electrically connected with gate electrodes of the transistors of the first pull-up transistor string PUTs1 and the first pull-down transistor string PDTs1 in the first inverter I1. The first output node N1 of the first inverter I1 may be electrically connected with gate electrodes of the transistors of the second pull-up transistor string PUTs2 and the second pull-down transistor string PDTs2 in the second inverter I2. The second output node N2 of the second inverter I2 may be electrically connected with an output terminal Vout. The first pull-up transistor string PUTs1 may include a different number of PMOS transistors from the second pull-up transistor string PUTs2. Furthermore, the first pull-down transistor string PDTs1 may include a different number of NMOS transistors from the second pull-down transistor string PDTs2.

The inventive concepts described with reference to FIG. 5 may be combined in various manners with the inverting circuits 41a to 41c and 42a to 42c, which have described with reference to FIGS. 3A to 3C and FIGS. 4A to 4C.

Figure 6A:
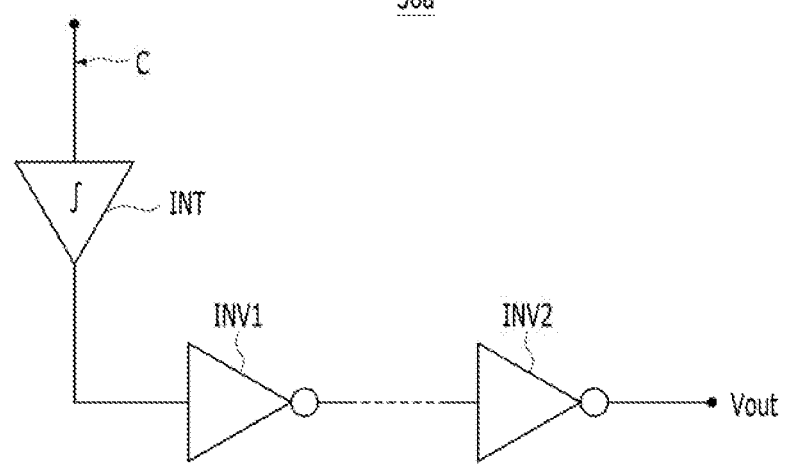
FIGS. 6A and 6B are block diagrams conceptually illustrating post-synaptic neurons in accordance with various embodiments.
Figure 6B:
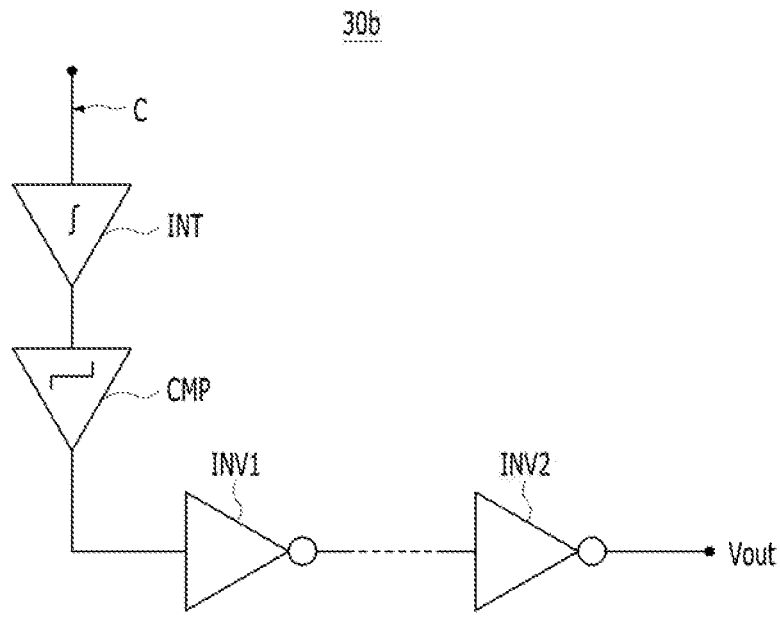

FIGS. 6A and 6B are block diagrams conceptually illustrating post-synaptic neurons 30a and 30b, in accordance with various embodiments. Referring to FIG. 6A, the post-synaptic neuron 30a may include an integrator INT and two or more inverters INV1 and INV2. An input port of the integrator INT may be electrically connected with a column line C. An output port of the integrator INT may be electrically connected with an input port of the first inverter INV1. The two or more inverters INV1 and INV2 may be connected with each other in series. The second inverter INV2 may be at a last stage of the two or more inverters INV1 and INV2, and an output port of the second inverter I2 may be electrically connected with an output terminal Vout of the post-synaptic neuron 30a.

Referring to FIG. 6B, the post-synaptic neuron 30b, in accordance with an embodiment, may include an integrator INT, a comparator CMP, and two or more inverters INV1 and INV2. Compared to FIG. 6A, an output port of the integrator INT may be electrically connected with one of input terminals of the comparator CMP. An output terminal of the comparator CMP may be electrically connected with an input port of the first inverter INV1.

Figure 7:
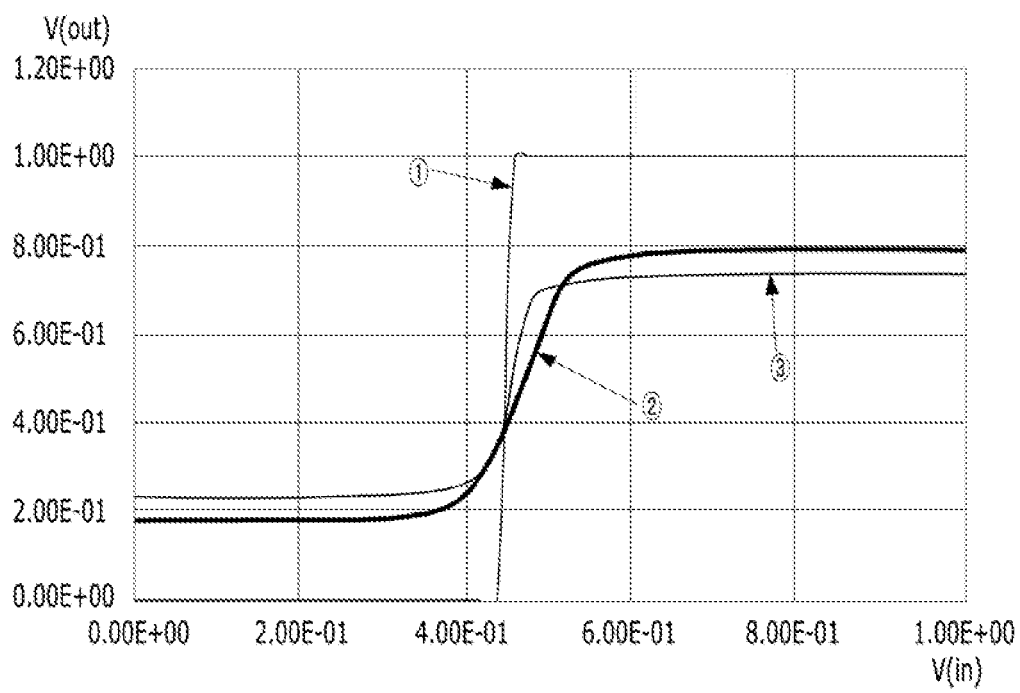
FIG. 7 is a graph illustrating outputs of a synapse array of a neuromorphic device that includes the inverting circuits illustrated in FIGS. 4B and 5, respectively.

FIG. 7 is a graph illustrating output voltages of a synapse array including the inverting circuits 42b and 43 illustrated in FIGS. 4B and 5, respectively. The vertical axis of FIG. 7 indicates output voltage V(out), and the horizontal axis of FIG. 7 indicates input voltage V(in).

Without an inverter, an output voltage V(out) of a synapse array may abruptly change, and have the shape of a pulse or a step function. In contrast, FIG. 7 illustrates that output voltages V(out) of the inverting circuits 42b and 43 are smooth, and resemble sigmoid functions when graphed with respect to the inverting circuits 42b and 43. Specifically, FIG. 7 illustrates an output voltage of the conventional inverting circuit ①, an output voltage of the inverting circuit 42b ②, and an output voltage of the inverting circuit 43 ③. An inverter of the conventional inverting circuit includes one pull-up transistor and one pull-down transistor which bodies and sources of the transistors are connected with each other, an inverter of the inverting circuit 42b includes two pull-up transistors and two pull-down transistors which bodies and drains of the transistors are connected with each other, and an inverter of the inverting circuit 43 includes four pull-up transistors and four pull-down transistors which bodies and drains of the transistors are connected with each other.

FIG. 7 illustrates that inverters having different combinations of pull-up transistors and pull-down transistors can be used to smooth an output of the synapse array of the neuromorphic device. For example, each of the outputs ①, ②, and ③ resembles a sigmoid function.

Figure 8:
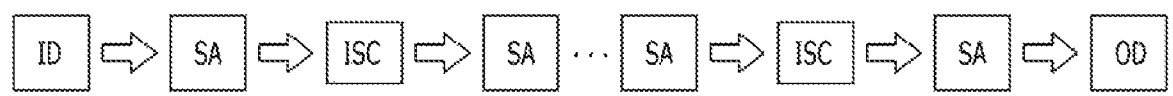
FIG. 8 is a block diagram conceptually illustrating a synapse array system of a neuromorphic device in accordance with an embodiment.

FIG. 8 is a block diagram conceptually illustrating a synapse array system of a neuromorphic device in accordance with an embodiment. Referring to FIG. 8, the synapse array system of the neuromorphic device may include an input device ID, a plurality of synapse arrays SA, one or more inter-synapse circuits ISC, and an output device OD. The inter-synapse circuits ISC may be arranged between the respective synapse arrays SA. The inter-synapse circuits ISC may include one or more of the inverting circuits 41a to 41c, 42a to 42c, and 43 in accordance with various embodiments illustrated in FIGS. 3A to 3C, FIG. 4A to 4C, and FIG. 5.

Figure 9:
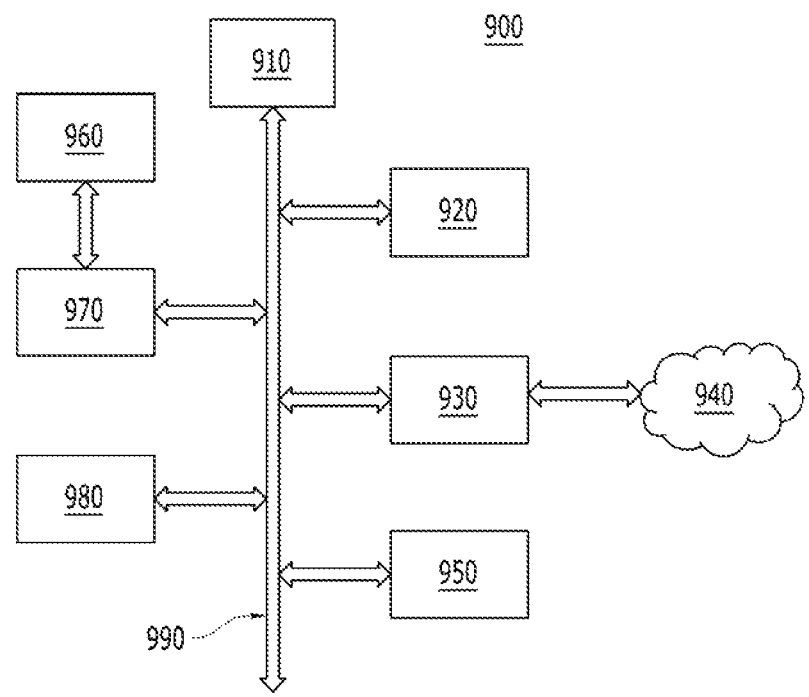
FIG. 9 is a block diagram conceptually illustrating a pattern recognition system in accordance with an embodiment.

FIG. 9 is a block diagram conceptually illustrating a pattern recognition system 900 in accordance with an embodiment. For example, the pattern recognition system 900 may include a speech recognition system, an imaging recognition system, a code recognition system, a signal recognition system, and one or more systems for recognizing various patterns. Referring to FIG. 9, the pattern recognition system 900 in accordance with the present embodiment may include a Central Processing Unit (CPU) 910, a memory unit 920, a communication control unit 930, a network 940, an output unit 950, an input unit 960, an Analog-Digital Converter (ADC) 970, a neuromorphic unit 980, and/or a bus 990.

The CPU 910 may generate and transmit various signals for a learning process of the neuromorphic unit 980, and perform various processes and functions for recognizing patterns according to an output from the neuromorphic unit 980. For example, the CPU 910 may perform processes and functions for recognizing speech and imaging patterns based on an output from the neuromorphic unit 980. The CPU 910 may be connected with the memory unit 920, the communication control unit 930, the output unit 950, the ADC 970, and the neuromorphic unit 980 through the bus 990.

The memory unit 920 may store various pieces of information, which are required to be stored in the pattern recognition system 900. The memory unit 920 may include one or more of a volatile memory device, such as DRAM or SRAM, a nonvolatile memory, such as PRAM, MRAM, ReRAM or NAND flash memory, and various memory units, such as Hard Disk Drive (HDD) and Solid State Drive (SSD).

The communication control unit 930 may transmit and/or receive data to and/or from a communication control unit of another system through the network 940. For example, the communication control unit 930 may transmit speech and/or image recognition data through the network 940.

The output unit 950 may output data in various manners. For example, the output unit 950 may include a speaker, a printer, a monitor, a display panel, a beam projector, a hologrammer, or other various output devices. The output unit 950 may output, for example, speech and/or image recognition data.

The input unit 960 may include a microphone, a camera, a scanner, a touch pad, a keyboard, a mouse, a mouse pen, or one or more of various sensors.

The ADC 970 may convert analog data inputted from the input unit 960 into digital data. The neuromorphic unit 980 may perform learning or recognition using the data outputted from the ADC 970, and output data corresponding to recognized patterns. The neuromorphic unit 980 may include one or more of the neuromorphic devices in accordance with the various embodiments described above.

In accordance with the present embodiments, a synapse array system may include synapse arrays, which smooth an output signal, such that the output signal is like a sigmoid function. Thus, synapse signals may have multi-levels.

Although various embodiments have been described for illustrative purposes, it will be apparent to those skilled in the art that various changes and modifications may be made without departing from the spirit and scope of the disclosure, as defined in the following claims.

What is claimed is:

1. A neuromorphic device comprising:
a pre-synaptic neuron;
a synapse electrically connected with the pre-synaptic neuron through a row line; and
a post-synaptic neuron electrically connected with the synapse through a column line,
wherein the post-synaptic neuron comprises a post-synaptic neuron circuit and a post-synaptic neuron inverting circuit electrically connected with the post-synaptic neuron circuit,
wherein the post-synaptic neuron inverting circuit includes a first post-synaptic inverter, the first post-synaptic inverter comprising a first post-synaptic pull-up transistor and a first post-synaptic pull-down transistor, and
wherein a body of the first post-synaptic pull-up transistor and a body of the first post-synaptic pull-down transistor are electrically connected with a first post-synaptic output node of the first post-synaptic inverter.

2. The neuromorphic device of claim 1, wherein the first post-synaptic pull-up transistor comprises:
a source electrode electrically connected with a supply voltage node;
a drain electrode electrically connected with the first post-synaptic output node; and
a gate electrode electrically connected with the column line.

3. The neuromorphic device of claim 1, wherein the first post-synaptic pull-down transistor comprises:
a source electrode electrically connected with a ground voltage node;
a drain electrode electrically connected with the first post-synaptic output node; and
a gate electrode electrically connected with the column line.

4. The neuromorphic device of claim 1, wherein the post-synaptic neuron inverting circuit further comprises a second post-synaptic inverter, the second post-synaptic inverter comprising a second post-synaptic pull-up transistor and a second post-synaptic pull-down transistor, a gate electrode of the second post-synaptic pull-up transistor and a gate electrode of the second post-synaptic pull-down transistor being electrically connected with the first post-synaptic output node.

5. The neuromorphic device of claim 4, wherein the second post-synaptic pull-up transistor comprises:
a source electrode electrically connected with the supply voltage node; and
a drain electrode electrically connected with a second post-synaptic output node.

6. The neuromorphic device of claim 5, wherein the second post-synaptic pull-down transistor comprises:
a source electrode electrically connected with the ground voltage node; and
a drain electrode electrically connected with the second post-synaptic output node.

7. The neuromorphic device of claim 1, wherein the post-synaptic neuron circuit comprises an integrator and a comparator, wherein an input terminal of the integrator is electrically connected with the column line,
an output terminal of the integrator is electrically connected with an input terminal of the comparator, and
an output terminal of the comparator is electrically connected with an input node of the first post-synaptic inverter.

8. The neuromorphic device of claim 1, wherein the pre-synaptic neuron comprises a pre-synaptic neuron inverting circuit and a pre-synaptic neuron circuit electrically connected with the pre-synaptic neuron inverting circuit, and wherein the pre-synaptic neuron inverting circuit includes a first pre-synaptic inverter, the first pre-synaptic inverter comprising a first pre-synaptic pull-up transistor and a first pre-synaptic pull-down transistor electrically connected in series,
wherein the first pre-synaptic pull-up transistor comprises:
a source electrode electrically connected with a supply voltage node;
a drain electrode electrically connected with a first pre-synaptic output node; and
a gate electrode electrically connected with an input terminal, and
wherein the first pre-synaptic pull-down transistor comprises:
a source electrode electrically connected with a ground voltage node;
a drain electrode electrically connected with the first pre-synaptic output node; and
a gate electrode electrically connected with the input terminal.

9. The neuromorphic device of claim 8, wherein the pre-synaptic neuron inverting circuit further comprises a second pre-synaptic inverter, the second pre-synaptic inverter comprising a second pre-synaptic pull-up transistor and a second pre-synaptic pull-down transistor, a gate electrode of the second pre-synaptic pull-up transistor and a gate electrode of the second pre-synaptic pull-down transistor being electrically connected with the first pre-synaptic output node.

10. A neuromorphic device comprising:
a pre-synaptic neuron;
a synapse electrically connected with the pre-synaptic neuron through a row line; and
a post-synaptic neuron electrically connected with the synapse through a column line,
wherein the post-synaptic neuron comprises a post-synaptic neuron circuit and a post-synaptic neuron inverting circuit electrically connected with the post-synaptic neuron circuit,
wherein the post-synaptic neuron inverting circuit includes a first post-synaptic inverter, the first post-synaptic inverter comprising:
a first post-synaptic output node;
a first post-synaptic p-channel metal-oxide semiconductor (PMOS) transistor having a source electrode, a drain electrode, and a body,
wherein the source electrode of the first post-synaptic PMOS transistor is electrically connected with a supply voltage node, and
wherein the drain electrode and the body of the first post-synaptic PMOS transistor are electrically connected with the first post-synaptic output node; and
a first post-synaptic n-channel metal-oxide semiconductor (NMOS) transistor having a source electrode, a drain electrode, and a body,
wherein the source electrode of the first post-synaptic NMOS transistor is electrically connected with a ground voltage node, and
wherein the drain electrode and the body of the first post-synaptic NMOS transistor are electrically connected with the first post-synaptic output node.

11. The neuromorphic device of claim 10, wherein the post-synaptic neuron inverting circuit further comprises a second post-synaptic inverter, the second post-synaptic inverter comprising:
a second post-synaptic output node;
a second post-synaptic PMOS transistor having a source electrode, a drain electrode, and a body,
wherein the source electrode of the second post-synaptic PMOS transistor is electrically connected with the supply voltage node, and
wherein the drain electrode and the body of the second post-synaptic PMOS transistor are electrically connected with the second post-synaptic output node; and
a second post-synaptic NMOS transistor having a source electrode, a drain electrode, and a body,
wherein the source electrode of the second post-synaptic NMOS transistor is electrically connected with the ground voltage node, and
wherein the drain electrode and the body of the second post-synaptic NMOS transistor are electrically connected with the second post-synaptic output node.

12. The neuromorphic device of claim 11, wherein the first post-synaptic output node of the first post-synaptic inverter is electrically connected with a gate electrode of the second post-synaptic PMOS transistor and a gate electrode of the second post-synaptic NMOS transistor.

13. The neuromorphic device of claim 11, wherein the second post-synaptic PMOS transistor comprises a plurality of PMOS transistors connected in series, the body of each of the plurality of PMOS transistors being electrically connected with the second post-synaptic output node.

14. The neuromorphic device of claim 10, wherein the first post-synaptic inverter comprises a plurality of NMOS transistors connected in series, the first post-synaptic NMOS transistor being one of the plurality of NMOS transistors, a body of each of the plurality of NMOS transistors being electrically connected with the first post-synaptic output node.

15. The neuromorphic device of claim 10, wherein the post-synaptic neuron circuit comprises an integrator and a comparator, wherein an input terminal of the integrator is electrically connected with the column line,
an output terminal of the integrator is electrically connected with an input terminal of the comparator, and
an output terminal of the comparator is electrically connected with an input node of the first post-synaptic inverter.

16. The neuromorphic device of claim 10, wherein the pre-synaptic neuron comprises a pre-synaptic neuron inverting circuit and a pre-synaptic neuron circuit electrically connected with the pre-synaptic neuron inverting circuit, and wherein the pre-synaptic neuron inverting circuit comprises a first pre-synaptic inverter, the first pre-synaptic inverter comprising:
a first pre-synaptic output node;
a first pre-synaptic PMOS transistor having a source electrode, a drain electrode, a gate electrode, and a body, wherein:
the source electrode of the first pre-synaptic PMOS transistor is electrically connected with the supply voltage node,
the drain electrode and the body of the first pre-synaptic PMOS are electrically connected with the first pre-synaptic output node, and
the gate electrode of the first pre-synaptic PMOS are electrically connected with an input terminal; and
a first pre-synaptic NMOS transistor having a source electrode, a drain electrode, a gate electrode, and a body, wherein:
the source electrode of the first pre-synaptic NMOS transistor is electrically connected with the ground voltage node,
the drain electrode and the body of the first pre-synaptic NMOS transistor are electrically connected with the first pre-synaptic output node, and
the gate electrode of the first pre-synaptic NMOS transistor is electrically connected with the input terminal.

17. The neuromorphic device of claim 16, wherein the pre-synaptic neuron inverting circuit further comprises a second pre-synaptic inverter, the second pre-synaptic inverter comprising a second pre-synaptic pull-up transistor and a second pre-synaptic pull-down transistor, a gate electrode of the second pre-synaptic pull-up transistor and a gate electrode of the second pre-synaptic pull-down transistor being electrically connected with the first pre-synaptic output node,
wherein the second pre-synaptic pull-up transistor comprises:
a source electrode electrically connected with the supply voltage node; and
a drain electrode electrically connected with a second pre-synaptic output node,
wherein the second pre-synaptic pull-down transistor comprises:
a source electrode electrically connected with the ground voltage node; and
a drain electrode electrically connected with the second pre-synaptic output node, and
wherein the second pre-synaptic output node is electrically connected with the pre-synaptic neuron circuit.

18. A neuromorphic device comprising:
an input device and an output device;
a plurality of synapse arrays between the input device and the output device, each of the plurality of synapse arrays including a plurality of synapses, each of the plurality of synapses being electrically connected with a pre-synaptic neuron through a row line; and
an inter-synapse circuit between the plurality of synapse arrays, the inter-synapse circuit including a post-synaptic neuron electrically connected with one of the plurality of synapses through a column line,
wherein the post-synaptic neuron of the inter-synapse circuit comprises a first post-synaptic inverter,
wherein the first post-synaptic inverter comprises a first post-synaptic pull-up transistor and a first post-synaptic pull-down transistor,
wherein the first post-synaptic pull-up transistor comprises one or more first post-synaptic p-channel metal-oxide semiconductor (PMOS) transistors, a body of each of the one or more first post-synaptic PMOS transistors being electrically connected with a first post-synaptic output node of the first post-synaptic inverter, and
wherein the first post-synaptic pull-down transistor comprises one or more first post-synaptic n-channel metal-oxide semiconductor (NMOS) transistors, a body of each of the one or more first post-synaptic NMOS transistors being electrically connected with the first post-synaptic output node of the first post-synaptic inverter.

19. The neuromorphic device of claim 18, wherein the inter-synapse circuit further comprises a second post-synaptic inverter connected in series to the first post-synaptic inverter,
wherein the second post-synaptic inverter comprises a second post-synaptic pull-up transistor and a second post-synaptic pull-down transistor,
wherein the second post-synaptic pull-up transistor comprises one or more second PMOS transistors, a body of each of the one or more second PMOS transistors being electrically connected with a second post-synaptic output node of the second post-synaptic inverter, and
wherein the second post-synaptic pull-down transistor comprises one or more second NMOS transistors, a body of each of the one or more second NMOS transistors being electrically connected with the second post-synaptic output node of the second post-synaptic inverter.

20. The neuromorphic device of claim 18, wherein the pre-synaptic neuron comprises a first pre-synaptic inverter,
wherein the first pre-synaptic inverter comprises a first pre-synaptic pull-up transistor and a first pre-synaptic pull-down transistor,
wherein the first pre-synaptic pull-up transistor comprises one or more first pre-synaptic p-channel metal-oxide semiconductor (PMOS) transistors, a body of each of the one or more first pre-synaptic PMOS transistors being electrically connected with a pre-synaptic output node of the first pre-synaptic inverter, and
wherein the first pre-synaptic pull-down transistor comprises one or more first pre-synaptic n-channel metal-oxide semiconductor (NMOS) transistors, a body of each of the one or more first pre-synaptic NMOS transistors being electrically connected with the pre-synaptic output node of the first pre-synaptic inverter.

* * * * *